(12) United States Patent
Groen et al.

(10) Patent No.: US 6,739,924 B1
(45) Date of Patent: May 25, 2004

(54) REMOTELY ACTIVATED BUOY

(76) Inventors: Henry Jay Groen, 2401 Pennsylvania Ave. NW., Suite 708, Washington, DC (US) 20037; Linwood Pete Smith, P.O. Box 271, 186 States Point Rd., Tenants Harbor, ME (US) 04860

( * ) Notice: Subject to any disclaimer, the term of this patent is extended or adjusted under 35 U.S.C. 154(b) by 0 days.

(21) Appl. No.: 10/355,163

(22) Filed: Jan. 31, 2003

(51) Int. Cl.[7] ................................................ B63B 22/18
(52) U.S. Cl. ............................................. 441/21; 441/2
(58) Field of Search ............................. 441/2, 7, 8, 10, 441/11, 21, 33

(56) References Cited

U.S. PATENT DOCUMENTS

| | | |
|---|---|---|
| 2,722,019 A | 11/1955 | Brock |
| 3,162,870 A | 12/1964 | Laird |
| 3,487,486 A | 1/1970 | Leonard et al. |
| 3,729,755 A | 5/1973 | Cochrane |
| 3,871,044 A | 3/1975 | Wedrall |
| 3,889,307 A | 6/1975 | Houot |
| 4,034,693 A | 7/1977 | Challenger |
| 4,262,379 A | 4/1981 | Jankiewicz |
| 4,778,422 A | 10/1988 | Saulnier et al. |
| 4,834,684 A * | 5/1989 | Tallerino ............... 441/2 |
| 6,261,142 B1 | 7/2001 | Fiotakis |
| 6,383,045 B1 | 5/2002 | Eckardt |

* cited by examiner

Primary Examiner—Jesus D. Sotelo
(74) Attorney, Agent, or Firm—Sughrue Mion, PLLC

(57) ABSTRACT

A remote controlled buoy includes a buoyant reel and an actuator. The buoyant reel includes connectivity for connecting the buoyant reel to the actuator. The actuator includes a releasing mechanism for releasing the buoyant reel from the actuator. The buoy may include a fail-safe watert-soluble corrosion link in the connectivity between the buoyant reel and the actuator, where, upon corroding over time, the energy-to-yield of the corrosion link becomes less than the buoyant energy of the buoy, allowing the buoy to surface a body of water

14 Claims, 6 Drawing Sheets

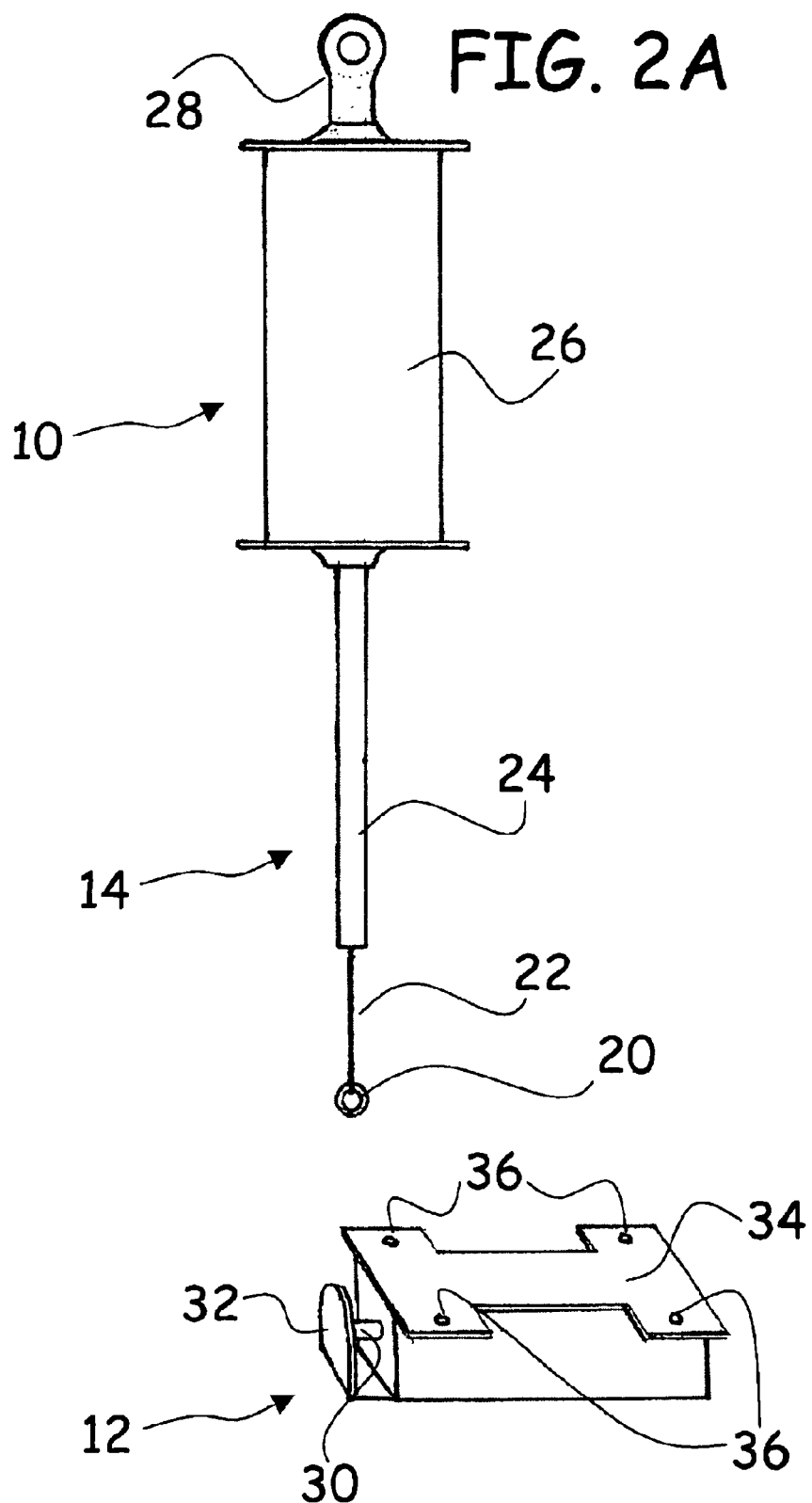

US 6,739,924 B1

REMOTELY ACTIVATED BUOY

FIELD OF THE INVENTION

This invention relates to a remote controlled buoy that can be used with submerged devices such as lobster traps, oil and gas machinery, and other underwater equipment.

BACKGROUND OF THE INVENTION

Buoys are well known for marking waterways and locations of submerged devices. Advances in technology have provided buoys capable of being submerged at their respective location, to be released by the use of timers or remote signal. Advantages in a buoy being submersible and remotely controlled are many. For example, a fisherman or lobsterman may desire to keep a crab pot or lobster trap hidden from poachers. Additionally, the tether of a buoy that stretches from the sea floor to the surface may get tangled in propellers, or, worse, become entwined with sea life, causing not only economic damage to the fisherman/lobsterman from the loss of capital, but potentially also harming magnificent creatures of the deep. By way of example, whales have died agonizing deaths from becoming entangled in lines tethered to surface buoys.

Arrangements for submersible, remote or timer controlled buoys are disclosed in U.S. Pat. Nos. 6,261,142 and 4,262,379. Both patents disclose submersible buoys attached to lobster or crab traps wherein the buoy is anchored by a pin to the trap. An actuator within the buoy releases its hold on the pin with use of a timer or optional transmission signal.

Such submersible buoys contain complex internal workings, making them cost-prohibitive to many family-run fishing enterprises. Additionally, such buoys cannot release from the pin if the buoy is inadvertently angled to a degree too high in relation to being upright, as in the condition of a lobster trap tumbling down an underwater ravine or cliff and/or landing at an odd angle. Furthermore, the buoy and trap are potentially lost forever if the complex inner workings fail for any reason, as such buoys do not possess an absolute fail-safe design. Additionally, submersible buoys that contain the tether internal to the buoy makes the buoy too large for commercial fishing operations that operate beyond the depth of a few fathoms. Moreover, the inseparability of the buoyant portion from the actuation/release mechanisms of such submersible buoys means that, upon failure, the entire buoy must be sent back to the factory for repair, unless, of course, the buoy and its respective submerged device, e.g. lobster trap, remain forever at the bottom of the ocean either because the release pin is at a wrong angle or because the system has otherwise failed.

SUMMARY OF THE INVENTION

Accordingly, it is a general object of the present invention to provide a remotely activated buoy which overcomes all of the disadvantages described above and other disadvantages of the prior art.

It is also an object of the present invention to provide a buoy including a buoyant reel and an actuator. The buoyant reel includes connectivity for connecting the buoyant reel to the actuator. The actuator includes a releasing mechanism for releasing the buoyant reel from the actuator.

It is a further object of the present invention to provide a buoy including a buoyant reel and an actuator, and including a fail-safe water-soluble corrosion link in the connectivity between the buoyant reel and the actuator, where, upon corroding over time, the energy-to-yield of the corrosion link becomes less than the buoyant energy of the buoy, allowing the buoy to surface a body of water.

It is yet a further object of the present invention to provide a buoy including a buoyant reel and an actuator. The buoyant reel includes connectivity means for connecting the buoyant reel to the actuator. The actuator includes releasing means for releasing the buoyant reel from the actuator.

It is yet another object of the present invention to provide a buoy including a buoyant reel and an actuator. The buoyant reel includes a first line for connecting the buoyant reel to the actuator. The actuator includes at least one of a solenoid, an electric motor and a hydraulic piston for releasing the first line from the actuator.

BRIEF DESCRIPTION OF THE DRAWINGS

The invention, both as to its organization and manner of operation, may be further understood by reference to the drawings that include FIGS. 1–6, taken in connection with the following descriptions.

FIG. 2A is an example of a buoyant reel in accordance with an embodiment of the invention;

FIG. 2B is an example of an actuator in accordance with an embodiment of the invention;

DETAILED DESCRIPTION OF PREFERRED EMBODIMENTS OF THE INVENTION

The following description of illustrative non-limiting embodiments of the invention discloses specific configurations and components. However, the embodiments are merely examples of the present invention, and thus, the specific features described below are merely used to describe such embodiments and to provide an overall understanding of the present invention. Accordingly, one skilled in the art will readily recognize that the present invention is not limited to the specific embodiments described below. Furthermore, the descriptions of various configurations and components of the present invention that are known to one skilled in the art are omitted for the sake of clarity and brevity.

Figure 1:
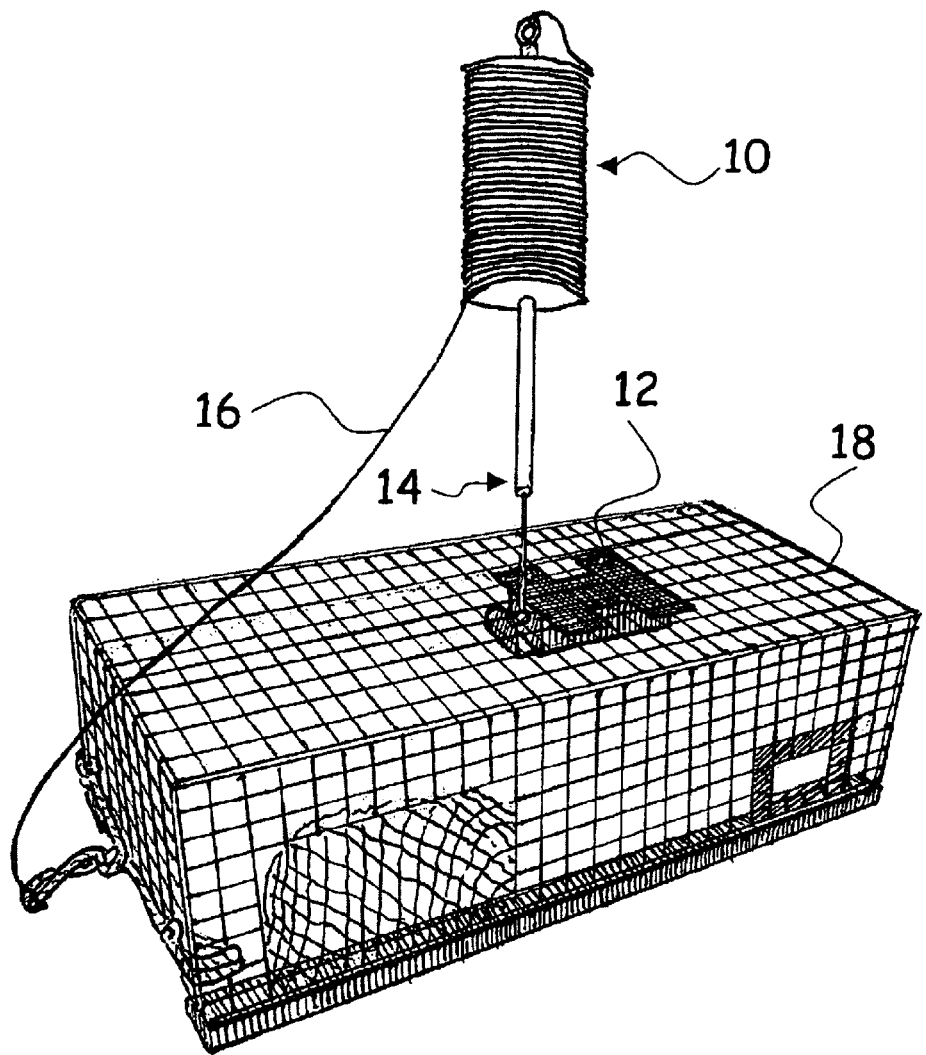
FIG. 1 is an illustration of a non-limiting embodiment of the invention in conjunction with a lobster trap.

FIG. 1 is an illustration of a preferred embodiment of the invention in conjunction with a lobster trap. As shown in the figure, a buoyant reel 10 is connected to an actuator/releasing mechanism 12 via a first line 14. The buoyant reel 10 is further tethered via a second line 16 to a submergible device 18, in this instance, a lobster trap. One skilled in the art would readily recognize, however, that the invention may be used with any equipment meant to be submerged to include, inter alia, oil and gas equipment and underwater communications cabling.

FIG. 2A illustrates a further embodiment of the invention. A buoyant reel 10 includes a first line 14 that provides connectivity between the buoyant reel 10 and an actuator/releasing mechanism 12. Further, FIG. 2A shows a first line 14, which includes an attachment ring 20, a connection cord 22 and a sighting mast 24. These will be discussed in turn.

The attachment ring 20 attaches to an actuator/releasing mechanism, such as the mechanism 12 in FIG. 1. The attachment ring 20 may be made of plastic, rubber or metal. The ring 20 may further be corrosively soluble in water. If the ring 20 is corrosively soluble in water, over time the energy-to-yield of the ring 20 becomes less than the buoyant energy of the buoyant reel 10. Such structure provides a fail-safe design where, upon system failure, the ring corrodes, allowing the buoy to surface a body of water. One of ordinary skill in the art would readily recognize that the ring 20 might instead be a hook, a knob, a ball, or other connection method for connecting to a corresponding actuator/release mechanism such as that shown in FIG. 1 as item 12, for example.

The ring 20 is connected to the buoyant reel 10 via a connection cord 22. The connection cord 22 may be a woven cord or cable, a wire, a rubber line or a rope or made of other material that is suitable for the application. In one embodiment of the invention, the connection cord 22 retracts the length that it is extended from a sighting mast 24 to the ring 20 upon release from an actuator/releasing mechanism. The retractable energy of the connection cord 22 may be less than the buoyant energy of the buoy, such that, in a submerged state, the buoyant reel 10 floats above a submerged device at a distance corresponding to the extended length of the connection cord 22, wherein, upon release from the actuator/release mechanism, the connection cord 22 retracts within sighting mast 24. The ability to retract upon release ensures that the connection cord 22 does not become entangled or caught on any structure as the buoy travels to the surface.

The sighting mast 24 provides an internal guide for the connection cord 22. Further, the buoyancy of the buoyant reel 10 is such that sighting mast 24 pops vertically upright upon surfacing a body of water. The sighting mast 24 is generally colored in bright fluorescence and/or vibrant patterns, making sighting mast 24 easy to locate and identify. The sighting mast 24 is attached to the main body component of the buoyant reel 10, wherein the buoyant reel 10 further includes a surface area 26.

The surface area 26 provides a location for winding a tether, such as the second line 16 (see FIG. 1) around the buoyant reel 10. An embodiment of the surface area 26 includes lips or ridges at either end of the buoyant reel 10, wherein the lips or ridges provide for ease of winding a tether, such as the second line 16 seen in FIG. 1, in circumferential loops around the buoyant reel. The tether, once wound around the surface area 26, may be held in place via a guide (not shown) wherein the buoyant energy of reel 10 is greater than the energy of the tether to resist unwinding from the surface area 26 as the tether unwinds through the guide as the buoy surfaces. Further, when the buoyancy of the reel 10 is constrained (such as in the case of the ring 20 being connected to the actuator/releasing mechanism 12), the energy of the constrained buoyancy is less than the energy necessary to unwind the tether from the surface area 26, keeping the tether wound prior to the deployment of the buoyant reel 10 from the submerged device 18. In another embodiment of the present invention, the guide does not allow the tether to unwind from the buoyant reel until the connection cord 22 retracts to within the sighting mast 24.

The buoyant reel 10 further includes an eyelet 28 for connectivity to a tether (such as the second line 16 in FIG. 1) in which the buoyant reel 10 remains tethered to a submerged device in either a wound (submerged) or unwound (surfaced) state. In yet another embodiment of the present invention, the second line 16 deploys from either the buoyant reel 10 or the submerged device 18.

FIG. 2B shows an embodiment of an actuator, such as that depicted by reference number 12 in FIG. 1. The actuator includes a retractable rod 30, over which the attachment ring 20 (of FIG. 2A) may be attached. The actuator 12 further includes a backstop 32. The backstop 32 is an "L" shaped structural piece that receives the retractable rod 30 in an extended state. By way of example, the buoyant reel 10 is attached to the actuator 12 when the ring 20 circumferentially surrounds the retractable rod 30 with the retractable rod 30 extended to the backstop 32. The actuator 12 is able to release the ring 20 (and thus the buoyant reel 10) upon retraction of the retractable rod 30. The actuator 12 further includes a cover plate 34 and securing eyelets 36. The securing eyelets 36 allow for attachment of the actuator 12 to a submergible device, such as item 18 of FIG. 1. The cover plate 34 provides access to the internal workings of the actuator 12 in a maintenance/manufacturing situation while providing a watertight seal at many fathoms in a functional setting. The securing eyelets 36 may be eyelets for screws, bolts, wire, zip ties, or the like, such that the actuator 12 may be securely attached to a submergible device 18.

Figure 3C:
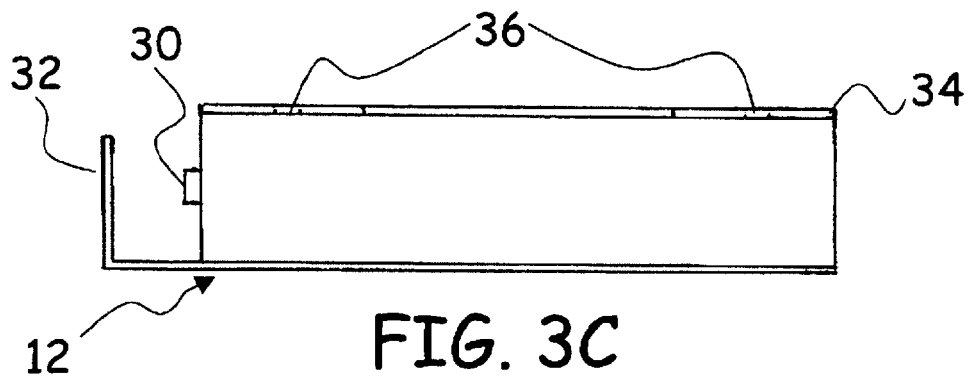
FIG. 3C is a side view of an actuator in accordance with an embodiment of the invention.
Figure 3B:
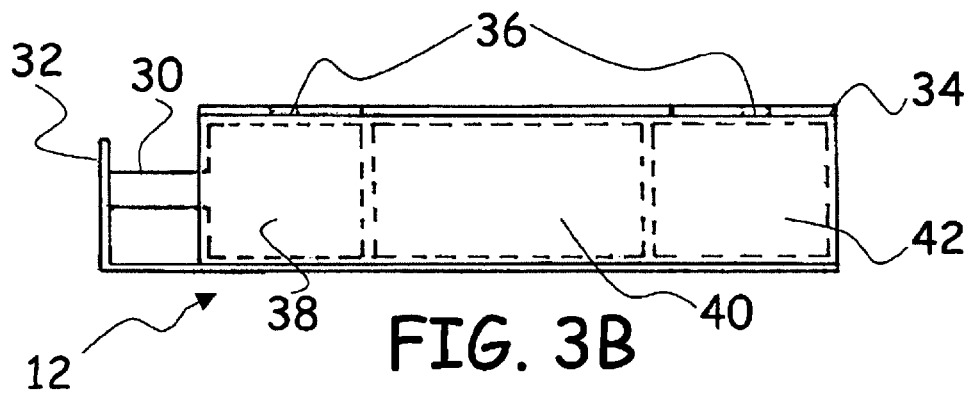
FIG. 3B is a diagrammatic side view of representative components of an actuator in accordance with an embodiment of the invention.
Figure 3A:
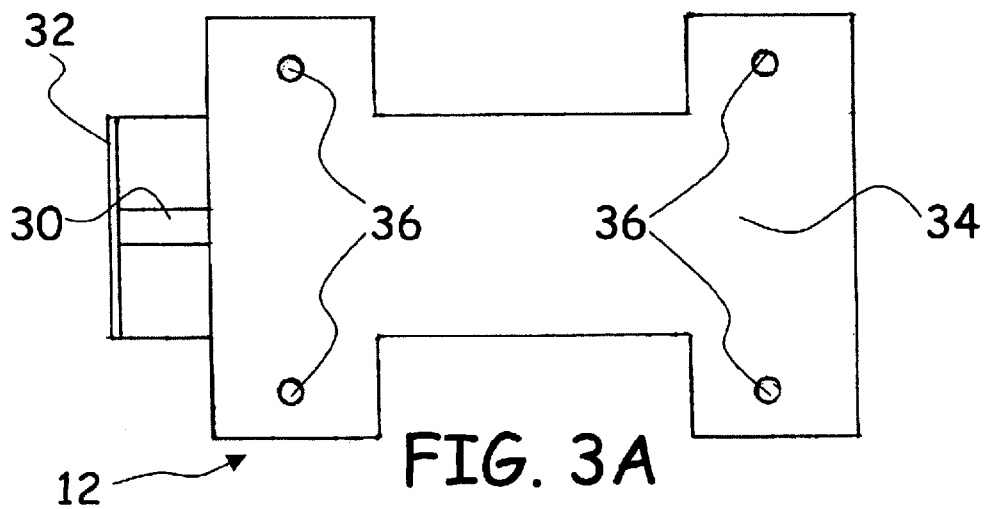
FIG. 3A is a top view of an actuator in accordance with an embodiment of the invention.

FIG. 3A is a top view of an embodiment of an actuator, such as those shown in FIGS. 1 and 2B. In FIG. 3A, the actuator 12 includes a retractable rod 30, backstop 32, cover plate 34 and securing eyelets 36. These elements may operate identically, similarly or equivalently to the elements discussed above as to FIG. 2B or the elements discussed below as to FIG. 3B, FIG. 3C, FIG. 4 or FIG. 5.

FIG. 3B is a side view of an embodiment of an actuator in accordance with an embodiment of the invention. The actuator 12 includes a retractable rod 30, backstop 32, cover plate 34, securing eyelets 36, actuation mechanism 38, power supply 40 and receiver 42. These elements will be discussed in turn.

The retractable rod 30 possesses a range of motion approximately the distance from the main body of the actuator 12 to the location on the backstop 32 where the rod 30, when in an extended state, makes contact with the backstop 32. The rod 30 creates a hermetical seal against the body of the actuator 12 such that a watertight quality is maintained in either of an extended or retracted state. As would be readily apparent to one skilled in the art, the rod 30 may further constitute a receptor for a hook, a knob, a ball or an equivalent to any of the previous, such that the connectivity matches the methods and their equivalents for attaching the buoyant reel 10 to the actuator 12 as previously discussed in relation to FIG. 2A.

The actuation mechanism 38 extends and retracts rod 30. The mechanism 38 may include a solenoid, an electric motor or a hydraulic piston. One of ordinary skill in the art would readily see that the actuation mechanism 38 may include the use of electricity, hydraulics, pneumatics or the like in extending or retracting rod 30.

The power supply 40 provides power to both actuation mechanism 38 and receiver 42. The power supply 40 may include off-the-shelf electrical batteries in the case of the mechanism 38 being run by electricity. Further, the power supply 40 may be a small fuel cell powered by hydrogen gas. Additionally, the power supply 40 may include a compressed gas or fluid as in the case of the actuation mechanism 38 being driven by pneumatics or hydraulics.

The receiver 42 receives control signals transmitted, for example, by a fisherman seeking to retrieve a lobster trap. Embodiments of the receiver may include the ability to receive various forms of control signals, the possible types of control signals including ones of sonar, acoustic, radio frequency and digitally encoded signals. In a further embodiment, if the receiver does not receive a proper control signal within a predetermined amount of time, receiver 42 actuates actuator 12 to release buoyant reel 10.

FIG. 3C is an actuator in accordance with a further embodiment of the present invention, wherein the rod 30 is shown in a retracted state. The actuator includes the rod 30, backstop 32, cover plate 34 and securing eyelets 36. These items operate identically, similarly or equivalently to the items discussed in relation to FIGS. 3A, 3B and 4.

Figure 4:
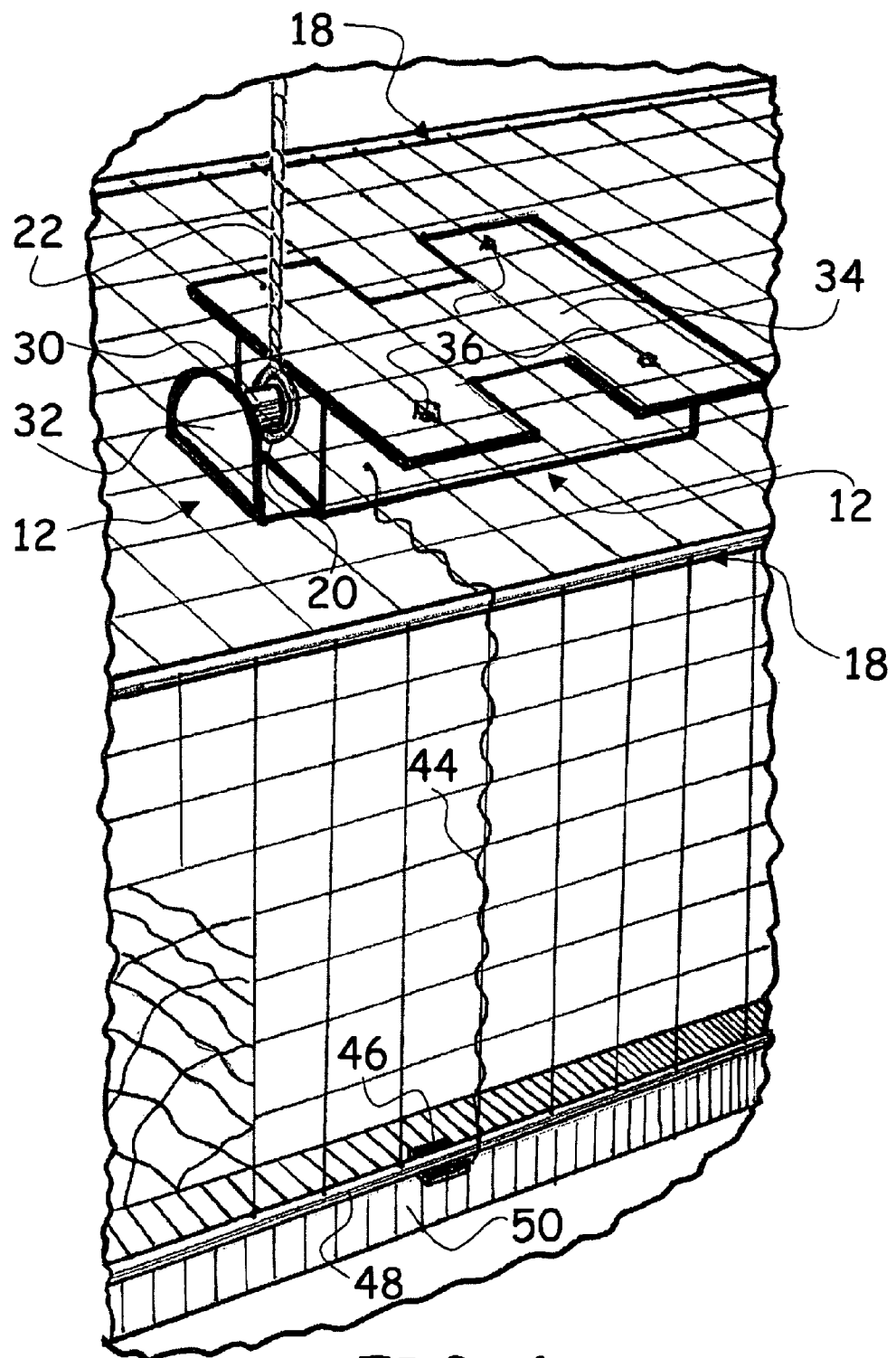
FIG. 4 is a cut-away illustration of a lobster trap and an embodiment of the invention including weight detectors.

FIG. 4 is a cut-away view of the submerged device 18 (in this instance, a lobster trap) showing an embodiment of the present invention including weight detector(s) 46. In the figure, the trap 18 further constitutes trap bottom 48 and runners 50, wherein trap 18 is submerged with the actuator/releasing mechanism 12 attached via the securing eyelets 36 in the cover plate 34 to the trap 18. The buoyant reel 10 (floating above the cut-away of the illustration) is connected to the actuator 12 via the connectivity ring 20 and connection cord 22. The connectivity ring 20 circumferentially surrounds the rod 30, wherein the rod 30, in an extended state, makes contact with the backstop 32. The electrical connection 44 connects the weight detector 46 to the actuation mechanism 38 within the actuator 12. One of ordinary skill in the art would readily understand that there may be a single weight detector 46 or that there may be plural weight detectors.

The rod 30 may be retracted upon a pre-determined amount of weight being detected by the weight detector(s) 46 as the weight detector(s) 46 are compressed between the cage bottom 48 and runners 50. Alternatively, the rod 30 may retract upon reception of a control signal as previously discussed in relation to FIG. 3B and as further discussed below in relation to FIGS. 5 and 6. In a fail-safe design, the ring 20 may constitute a water-soluble corrosive link that deteriorates over time, wherein the buoyant energy of the buoyant reel becomes greater than the energy-to-yield of the corrosively water-soluble ring 20, allowing the buoy to surface a body of water. Thus, for example, if the actuator were to fail for any reason, whether due to low power, a system short or damage from a foreign object or creature, the ring 20 deteriorates over time, allowing the buoy to surface regardless of circumstance.

Figure 5:
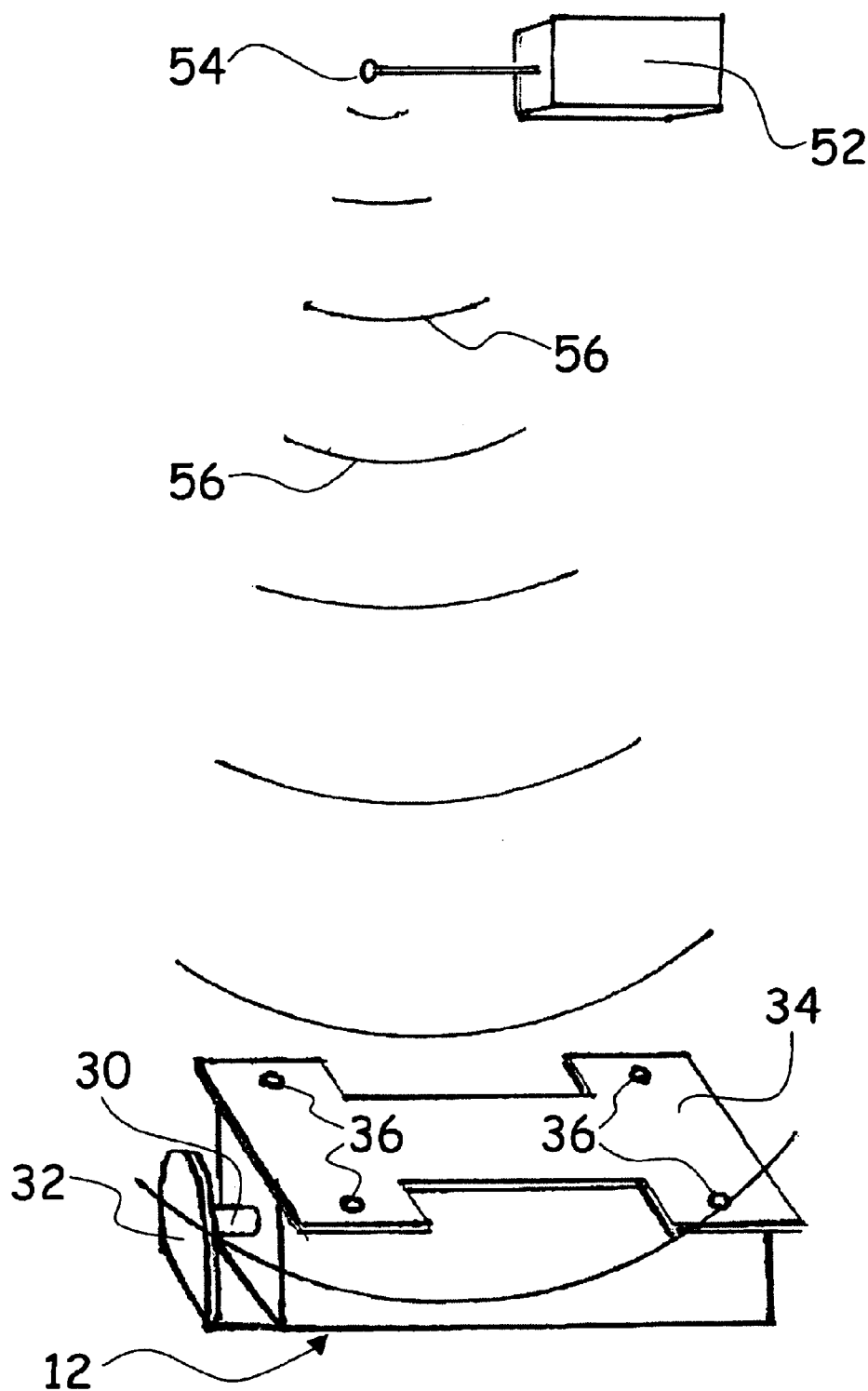
FIG. 5 is an illustration of an embodiment of the invention wherein an actuator is activated using transmitted signals from a transmitter.

FIG. 5 shows a transmitter 52 with an antenna 54 transmitting a control signal 56 to actuator/releasing mechanism 12. The actuator/releasing mechanism 12 includes the retractable rod 30, backstop 32, cover plate 34 and securing eyelets 36. Transmitted control signals 56 may include one or more of sonar, acoustic, radio frequency and digitally encoded signals. Further, the transmitted signals 56 may shift digital codes and/or frequencies upon each subsequent transmittal, such that security is maintained in retrieving the submerged device. This arrangement is useful in deterring poachers or others of ill repute.

Figure 6:
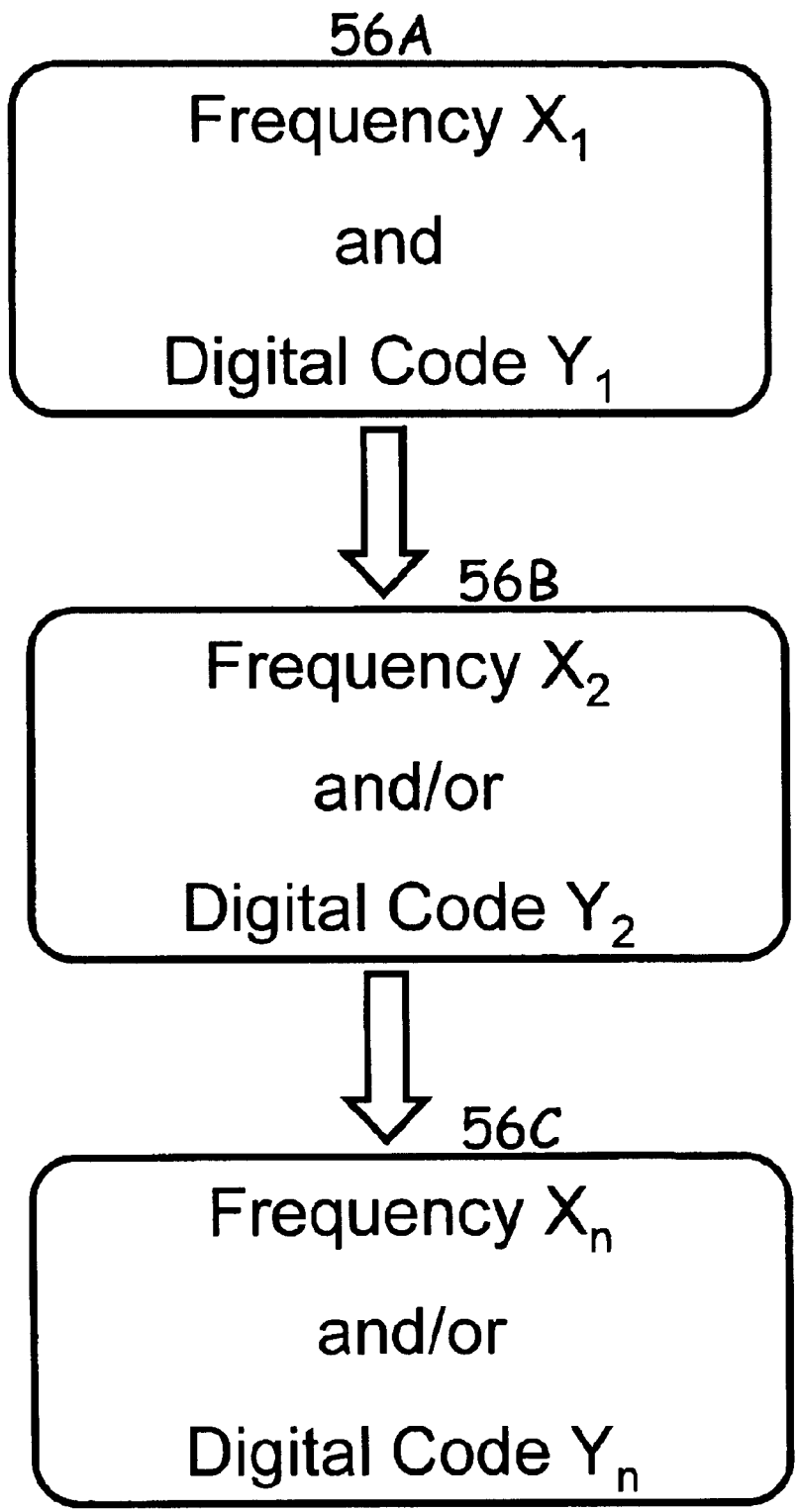
FIG. 6 is a block diagram according to a further embodiment of the invention wherein transmitted signals shift digital codes and/or frequencies upon subsequent transmittals.

FIG. 6 is a block diagram of the transmitted signals 56 shifting digital codes and/or frequencies. In block 56A, the digital code used to operate the invention begins at, for example, $Y_1$. Alternatively, frequency $X_1$ or a combination of a digital code and frequency are used, represented by $Y_1X_1$. Upon a subsequent transmittal/reception, the digital code and/or frequency "shifts" to $Y_2$, $X_2$, or $Y_2X_2$, respectively, as shown in block 56B. In FIG. 56C, the digital code and/or frequency "shifts" again (the block representing an infinite number of repetitive transmittals/receptions) to $Y_n^{th}$, $X_n^{th}$, or, $Y_n^{th}X_n^{th}$, respectively.

The above embodiments clearly have various advantages over the prior art. Advantageous characteristics in the embodiments of the present invention include: simplicity of design; easily replaceable components wherein the failure of one portion does not require the entire buoy to be sent back to the factory; cost-effectiveness in view of the previous; benefit of size (as the tether is not contained within the buoy); a fail-safe design; limitation of potential impact of tethered buoys upon ocean life; release of the buoy upon remote control regardless of the angle at which the buoy finds itself on the ocean floor; protection of legitimate fishermen from poachers and thieves; and potential preservation of the lobster industry in light of environmental pressures.

The previous description of the preferred embodiments is provided to enable a person skilled in the art to make and use the present invention. Moreover, various modifications to these embodiments will be readily apparent to those skilled in the art, and the generic principles and specific examples defined herein may be applied to other embodiments without the use of inventive faculty. For example, some or all of the features of the different embodiments discussed above may be deleted from the embodiment. Therefore, the present invention is not intended to be limited to the embodiments described herein but is to be accorded the widest scope defined only by the claims below and equivalents thereof.

What is claimed is:

1. A buoy comprising:

a buoyant reel; and an actuator;

said buoyant reel including connectivity means for connecting said buoyant reel to said actuator; and said actuator including releasing means for releasing said buoyant reel from said actuator; and further wherein the connectivity means includes a corrosion link, said corrosion link being corrosively soluble in water; where, upon corrosion over time, the energy-to-yield of the corrosion link becomes less than the buoyant energy of the buoy, wherein the buoy is then allowed to surface a body of water.

2. A buoy comprising:

a buoyant reel; and an actuator;

said buoyant reel including connectivity means for connecting said buoyant reel to said actuator; and said actuator including releasing means for releasing said buoyant reel from said actuator; and further wherein the actuator is remotely controlled via transmitted signals.

3. The buoy of claim 2, further wherein the transmitted signals include at least one of sonar, acoustic, radio frequency and digitally encoded signals.

4. The buoy of claim 3, further wherein the transmitted signals shift digital codes and/or frequencies upon subsequent transmittals.

5. A buoy comprising:
   a buoyant reel and an actuator; said buoyant reel including connectivity means for connecting said buoyant reel to said actuator; said actuator including releasing means for releasing said buoyant reel from said actuator, wherein:
   the buoyant reel is wound with a line;
   said line unreeling from the buoyant reel when the buoyant reel is released from said actuator; wherein being released from said actuator allows the buoyant reel to surface a body of water while tethered by said line to a submerged device;
   said submerged device being attached to said actuator; and further wherein
      the submerged device includes at least one weight detector;
      said weight detector(s) allowing the actuator to release the buoyant reel upon the weight detector(s) detecting a pre-determined amount of weight applied to the submerged device.

6. The buoy of claim 5, further wherein the line deploys from either of the submerge device and the buoyant reel.

7. A buoy comprising:
   a buoyant reel; and
   an actuator;
   said buoyant reel including a first line for connecting said buoyant reel to said actuator; and
   said actuator comprising at least one of a solenoid, an electric motor and a hydraulic piston for releasing said first line from said actuator.

8. The buoy of claim 7, further wherein:
   the buoyant reel is wound with a second line;
   said second line unreeling from the buoyant reel when the buoyant reel is released from said actuator; wherein being released from said actuator allows the buoyant reel to surface a body of water while tethered by said second line to a submerged device;
   said submerged device being attached to said actuator.

9. The buoy of claim 8, further wherein the second line deploys from either of the submerged device and the buoyant reel.

10. The buoy of claim 8, further wherein the submerged device includes at least one weight decetor;
    said weight detector(s) allowing the actuator to release the buoyant reel upon the weight detector (s)detecting a pre-determined amount of weight applied to the submerged.

11. The buoy of claim 7, further wherein the first line includes a corrosion link, said corrosion link being corrosively soluble in water; where,
    upon corrosion over time, the energy-to-yield of the corrosion link becomes less than the buoyant energy of the buoy, wherein the buoy is then allowed to surface a body of water.

12. The buoy of claim 7, further wherein the actuator is remotely controlled via transmitted signals.

13. The buoy of claim 12, further wherein the transmitted signals include at least one of sonar, acoustic, radio frequency and digitally encoded signals.

14. The buoy of claim 13, further wherein the transmitted signals shift digital codes and/or frequencies upon subsequent transmittals.

* * * * *